(12) United States Patent
Basson et al.

(10) Patent No.: US 6,965,773 B2
(45) Date of Patent: Nov. 15, 2005

(54) VIRTUAL COOPERATIVE NETWORK FORMED BY LOCAL CLIENTS IN ZONES WITHOUT CELLULAR SERVICES

(75) Inventors: Sara H. Basson, White Plains, NY (US); Dimitri Kanevsky, Ossining, NY (US); Mariusz Sabath, Scarsdale, NY (US); Jan Sedivy, Praha (CZ); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 09/827,274

(22) Filed: Apr. 5, 2001

(65) Prior Publication Data

US 2002/0146978 A1 Oct. 10, 2002

(51) Int. Cl.[7] .................................................. H04B 7/15
(52) U.S. Cl. ................ 455/445; 455/404.1; 455/456.6; 455/500; 455/517
(58) Field of Search ............................. 455/11.1, 454, 455/417, 445, 9–10, 414.2, 503, 521, 13.1, 455/404.1, 500, 517, 456.1, 456.6, 16

(56) References Cited

U.S. PATENT DOCUMENTS

| | | | | |
|---|---|---|---|---|
| 4,977,589 A | * | 12/1990 | Johnson et al. ............. | 455/539 |
| 5,396,429 A | * | 3/1995 | Hanchett ..................... | 701/117 |
| 5,603,080 A | * | 2/1997 | Kallander et al. ............ | 455/14 |
| 5,850,593 A | * | 12/1998 | Uratani ....................... | 455/11.1 |
| 5,890,054 A | * | 3/1999 | Logsdon et al. ........... | 455/11.1 |
| 5,915,208 A | * | 6/1999 | Collyer ....................... | 455/11.1 |
| 6,125,279 A | * | 9/2000 | Hyziak et al. .............. | 455/445 |
| 6,390,365 B1 | * | 5/2002 | Karasawa ................... | 235/384 |
| 6,590,875 B1 | * | 7/2003 | Niwa .......................... | 370/328 |
| 6,647,244 B1 | * | 11/2003 | Haymond et al. ......... | 455/11.1 |
| 6,735,417 B2 | * | 5/2004 | Fonseca, Jr. et al. ...... | 455/11.1 |

* cited by examiner

Primary Examiner—William Trost
Assistant Examiner—Brandon J. Miller
(74) Attorney, Agent, or Firm—Scully, Scott, Murphy & Presser; Daniel P. Morris

(57) ABSTRACT

A method and system for forming a virtual network. The method comprises the steps of providing each of a plurality of mobile objects with a transceiver, and transmitting a cellular/radio signals from a source. At least a first of the mobile objects is located in an area where the transceiver of the first mobile object does not receive the signal directly from the source, while a second of the mobile objects is in a position where the transceiver of the second mobile object receives the signal directly from the source. The transceiver of the second mobile object is used to receive the signal directly from the source and to transmit the signal to the transceiver of the first mobile object.

20 Claims, 6 Drawing Sheets

VIRTUAL COOPERATIVE NETWORK FORMED BY LOCAL CLIENTS IN ZONES WITHOUT CELLULAR SERVICES

BACKGROUND OF THE INVENTION

1. Field of the Invention

This invention generally relates to mobile communications, and more specifically, to a virtual cooperative network formed by mobile objects.

2. Prior Art

Mobile communication devices can lose the ability to receive and transmit signals when they are in certain locations. For example, when people are driving through a tunnel they lose radio transmission and communication via cell phone becomes impossible. The same situation happens when a user enters the underground metro or railway station. One possible solution to this problem is to install a local transmission station inside the tunnel or underground in the metro area. This is not a particularly effective solution, however, because transmission stations are not installed everywhere, and moreover this solution would be very expensive. The majority of tunnels and metro stations do not have such equipment.

SUMMARY OF THE INVENTION

An object of this invention is to improve the transmission and reception capabilities of cellular devices.

Another object of the present invention is to provide a virtual network that allows cellular devices to transmit and receive in underground areas, such as in tunnels and subway stations.

Another object of the present invention is to provide emergency channels for sending emergency messages in areas where cellular providers cannot reach cellular telephones.

Another object of the invention is to define the density of cars by interchanging signals between neighboring cars.

Another object of the invention is to use additional chips embedded in E-Z passes for interchanging signals between cars.

These and other objectives are attained with a method and system for forming a virtual network. The method comprises the steps of providing each of a plurality of mobile objects with a transceiver, and transmitting a cellular/radio signals from a source. At least a first of the mobile objects is located in an area where the transceiver of the first mobile object does not receive the signal directly from the source, while a second of the mobile objects is in a position where the transceiver of the second mobile object receives the signal directly from the source. The transceiver of the second mobile object is used to receive the signal directly from the source and to transmit the signal to the transceiver of the first mobile object.

Preferably, each of the mobile objects is provided with a sensor to determine when the transceivers of others of the mobile objects are not able to receive the cellular/radio signals directly from the source. When the sensor of one of the mobile objects determines that the transceiver of another of the mobile objects is not able to receive the signals directly from the source, the sensor of said one of the mobile objects activates the transceiver of said one of the mobile objects to transmit the signal to the transceiver of the other of the mobile object.

For example, a virtual network embodying the invention may be formed of cars inside a tunnel. The cars inside the tunnel will transmit the signal between each other. If cars are moving inside the tunnel that is not equipped with the local transmission station, every car will start transmitting signals to the cars next to it. Each car in the chain becomes a transmitter or conductor of the signal. This chain of transmitting signals continues until it reaches the car outside the tunnel with a clear signal, that can be transmitted to the car inside the tunnel. This continues through all the cars inside of tunnel until the car moves out the tunnel.

The electronic equipment that transmits the signal can be done the same way as currently used optical toll payment systems such as those referred to as E-Z Pass. An additional chip can be embedded in the E-Z Pass or installed inside the car during the car production by the car manufacture, allowing the car to receive and transmit a signal to nearby cars. Such an electronic chip inside of the car can be used for other purposes such as remote diagnostics when the car has any problem. This could be another E-Z Pass function. It can also be used for determining the car density on the road for detecting traffic jams in certain areas. The denser the traffic, the greater is the congestion of cars, and the smaller the distance between the cars and their transmitters. When the cars are close to each other, they can receive the weak signal from the neighboring car. An advantage of this is that there is no need to install a powerful transmitter inside of the car; a weak transmitter would suffice. Also, this electronic chip can transmit signals to a satellite to determine the traffic conditions in certain areas.

The opportunity to transmit signals from one car to another car can be used for multiple purposes. It may be a permanent device inside the car, and for example this electronic chip can be used for receiving and transmitting signals between cars inside tunnels, bridges or other areas, where it is not possible to receive signals from transmitting stations. It is important for people that are stopped in heavy traffic inside a tunnel to have the ability to call and report the delay. This invention will allow them to transmit the cell phone signal from one car to another until the signal gets outside the tunnel, where the signal can be successfully transmitted.

This invention also provides the ability, for instance, to check the stock market quotations by someone who is stopped inside a tunnel and who has a need to check the price quote. The same applies with placing a transaction over the cell phone. If the signal is very weak, they will not be able to communicate inside the tunnel. This invention allows this to be accomplished.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
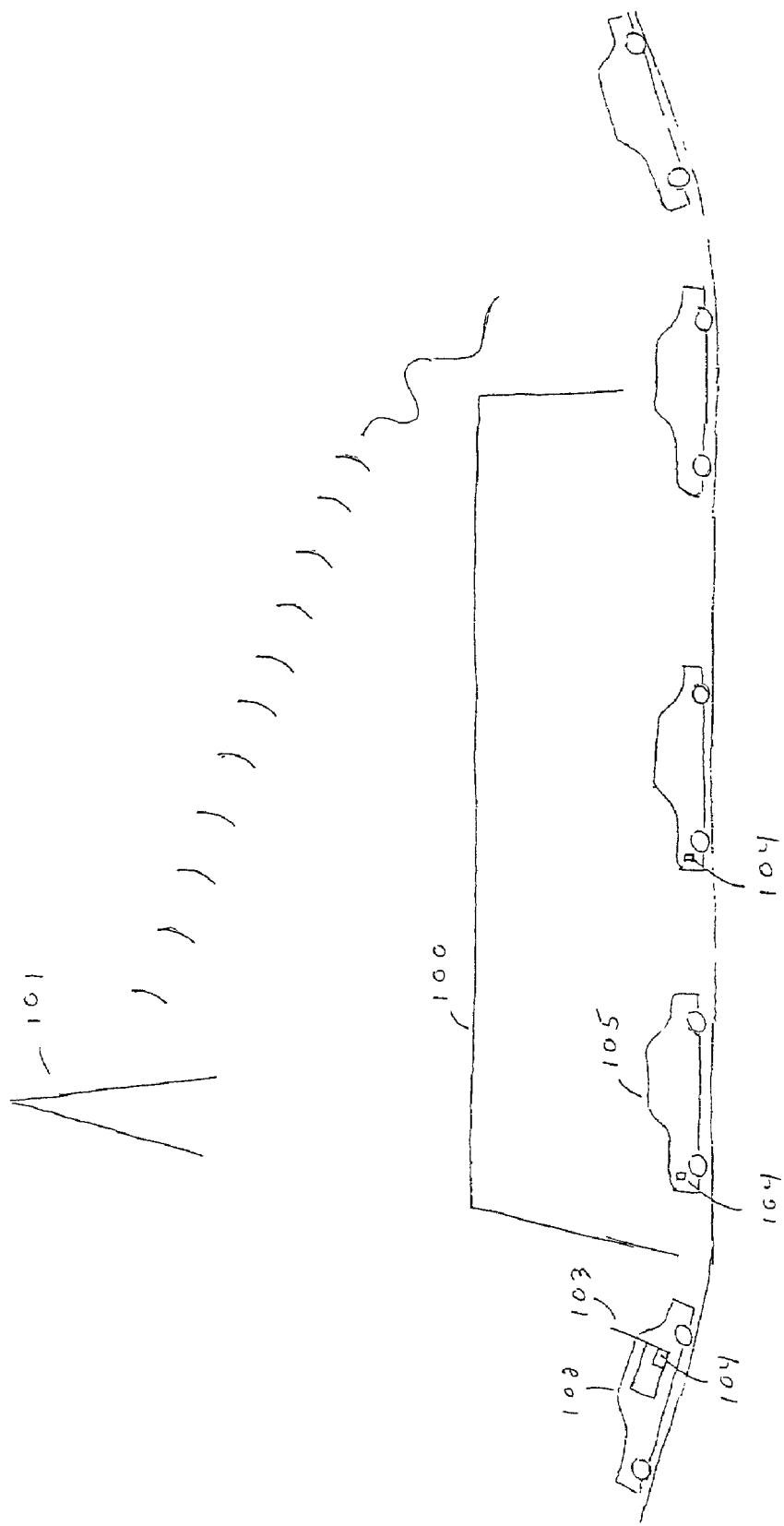
FIG. 1 illustrates a virtual network formed of cars inside a tunnel.

FIG. 1 generally describes how the signal is transmitted from one car to another car. Number 100 is a tunnel, 101 is a cellular transmitting station that transmits the signal to car 102 that gets into the tunnel. Car 102 transmits the signal via antenna 103. All the signals that the car receives through its antenna get transmitted, via electronic chip 104, inside the tunnel to the car next to it (car 105). This is how the signal from outside the tunnel gets inside the tunnel. The receiving chip 104 on the car inside the tunnel will receive the signal. Now, the car inside the tunnel transmits the signal from electronic chip 104 to the car next to it, to its electronic chip 104 and so on. The car that receives the signal operates with the signal exactly the same way as it would as if it received the signal directly from the station 101; as if the car was outside the tunnel.

Figure 2:
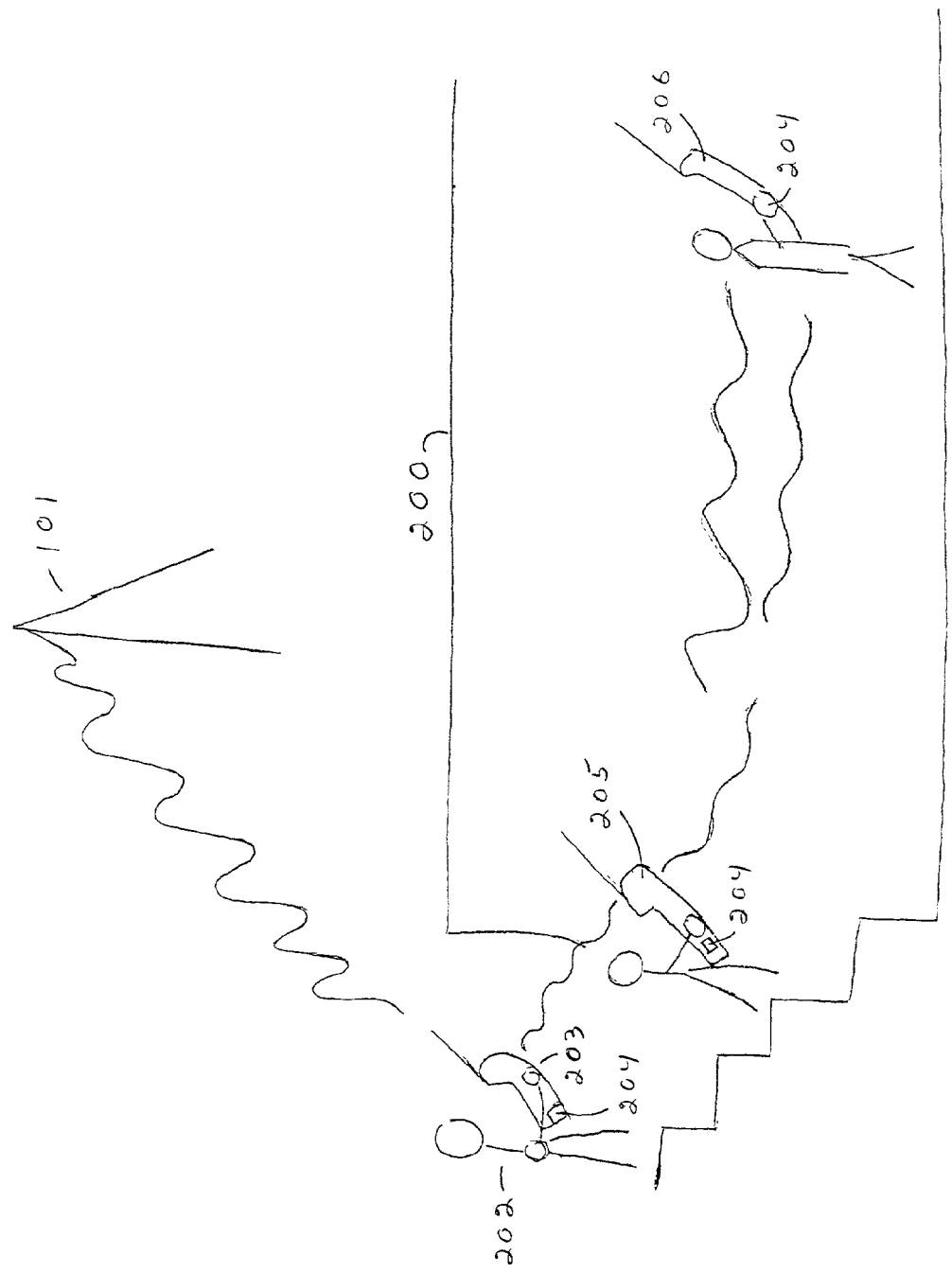
FIG. 2 shows a virtual network comprised of people in a tunnel.

FIG. 2 shows the case where, instead of vehicles, people are inside a tunnel or underground 200 in a metro station or other place with limited radio transmission. Transmission station 101 transmits the signal. 202 represents a person who is about to enter a tunnel. This person has a cellular phone 203 which still can receive the signal directly from transmission station 101. The cell phone 203 has an electronic chip 204 that is capable of transmitting a signal by itself for short distances. This signal gets sent from the cell phone 203 to a cell phone 205 with an electronic chip 204 that can receive the signal. The user with the cell phone 205 is inside the tunnel and cannot receive the signal directly from the transmitting station 101. The signal from this user with cell phone 205 gets transmitted to the next cell phone user who has a phone 206 with electronic chip (transeiver) 204 to receive the signal. Thus, all the signals get transmitted from the user outside the tunnel to the next user, through the chain of other users, using their cell phone transeiver chip to transmit the signal.

Figure 3:
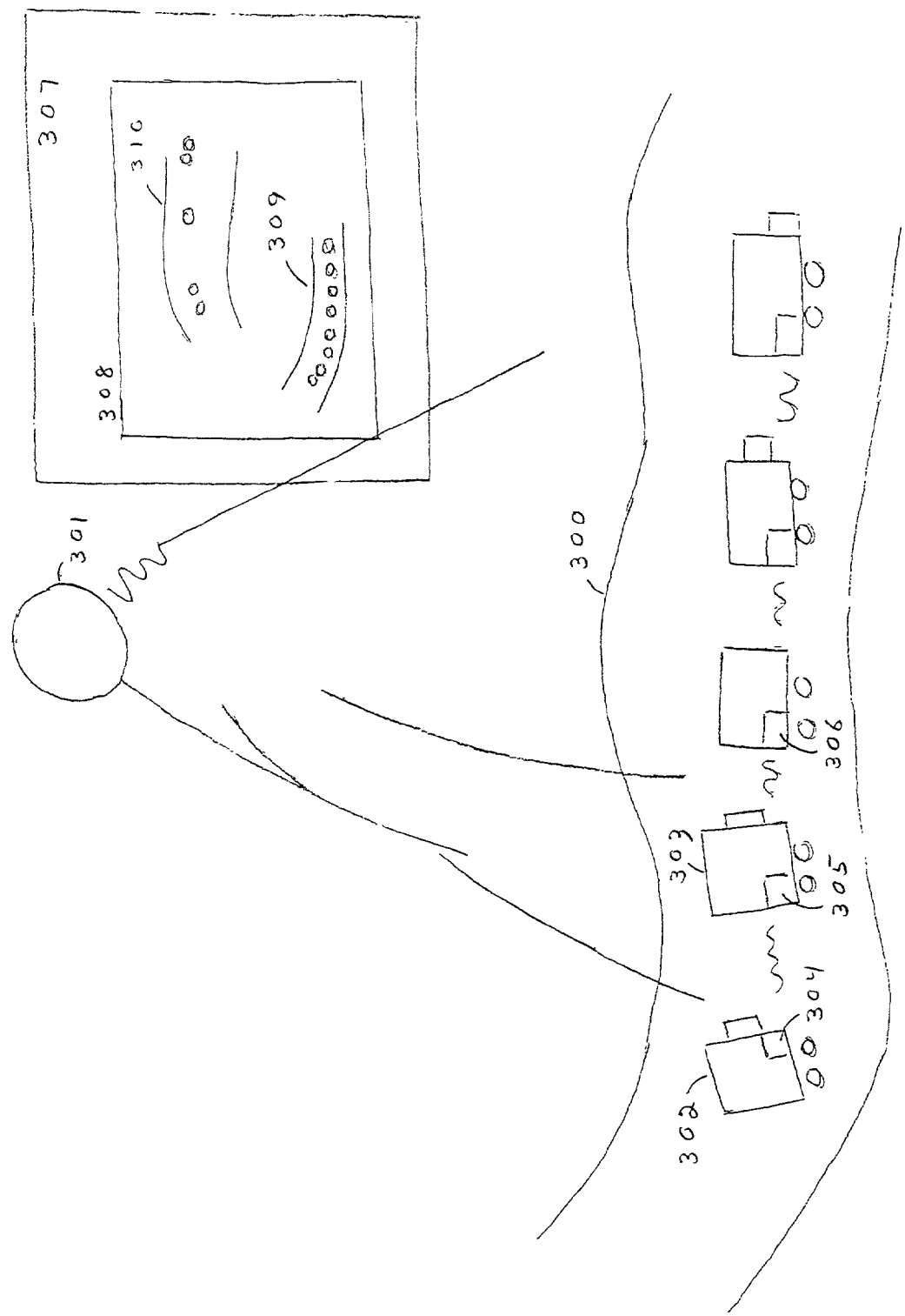
FIG. 3 shows a transceiver inside a car.

FIG. 3 gives an example of how to use the transeiver inside the car. It will be used to determine traffic jams. 300 is the road with moving cars. 301 is the satellite 302, 303 etc. are the cars on the road equipped with the transeiver electronic devices 304, 305, 306 respectively. The transeiver device is allowed to transmit the signal on very short distances. The signal gets sent from the transeiver 304 and received by transeiver 305 and the distances are measured and sent to satellite 301. This information is sent from satellite 301 to computer 307, and on the computer screen 308, the picture shows the traffic for this particular region.

The example given here shows road 309 packed with cars that create a traffic jam. At the same time, the picture shows cars traveling freely along a road 310. This information later gets transmitted to car drivers and tells them what streets in the city have traffic jams and shows them alternate roads. This also can be used to transmit information about how many people are in a particular city or region. For example, it would be possible to determine the number of people that show up at a demonstration, sports event or other gathering. By using a cell phone that people carry it is possible that the electronic transeiver chip can report how many people are located in one particular region.

Figure 4:
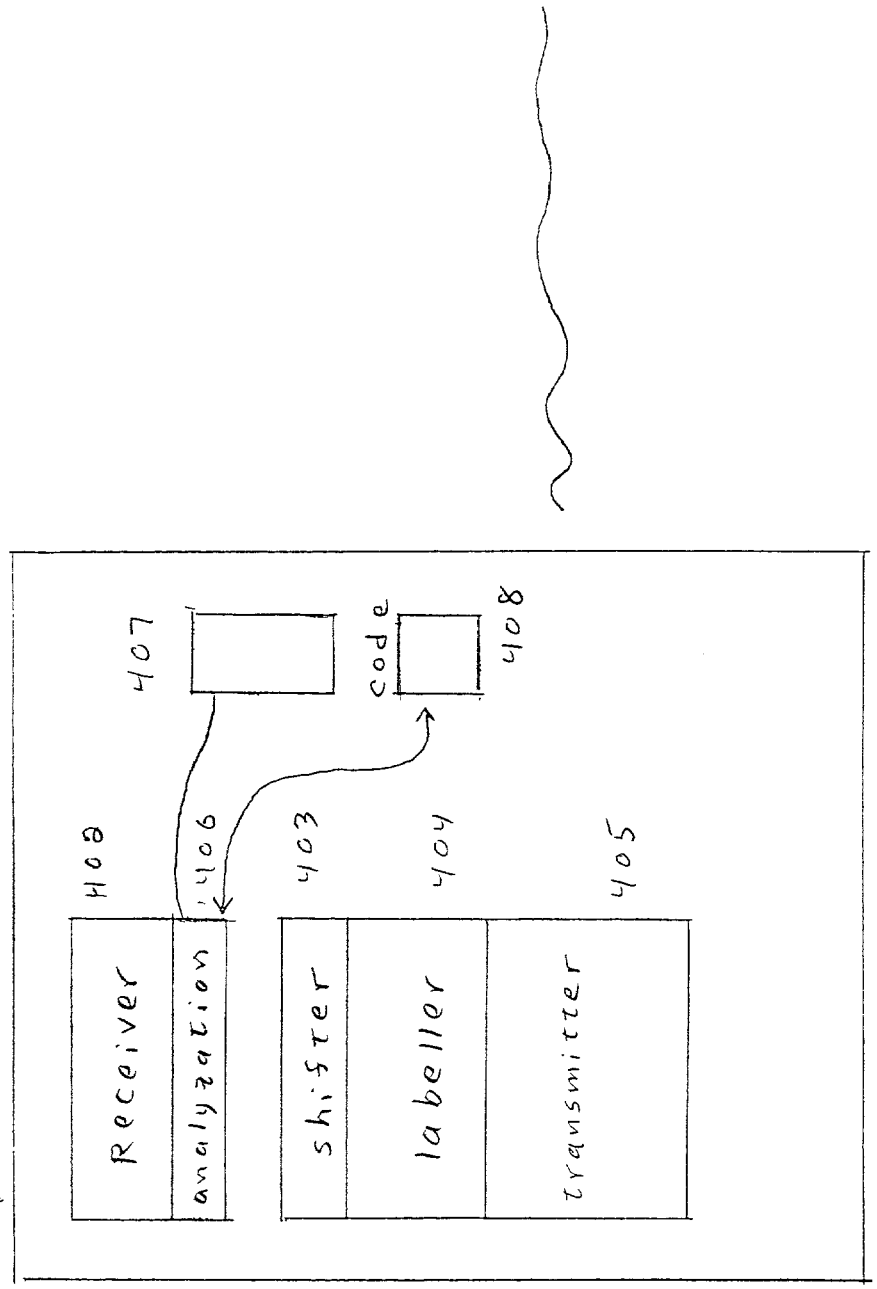
FIG. 4 is a block diagram of an electronic transceiver chip that may be used in this invention.

FIG. 4 is a block diagram of the electronic transeiver chip that is capable of receiving and transmitting a signal from one cell phone to another phone and from one car to another car. The cell phone 400, 401 antenna, 402 receiver that contains analyzer 406. Analyzer is capable of determining whether some of the received signals are required to be transmitted. It is possible to do this whether or not people subscribe to a particular service. For example, whether or not it is allowed to transmit a signal inside a tunnel. Only the signal that is marked to allow transmitting will be transmitted further. Analyzer 406 will check if the signal is marked for further transmission. Analyzer also checks whether the signal is marked as an "emergency signal." This can be in a case where there was a traffic accident in a tunnel or some driver in a tunnel had a cardiac attack. If the signal is marked as an "emergency signal," it will receive preferred treatment. It can be transmitted through a frequency band that is most widely available to other cellular devices. Under a special agreement, one can block other signals that are transmitted through this frequency band in order to allow the transmission of the emergency signals.

If transmission of the signal is allowed, the signal will be labeled and the frequency of the signal will be changed to transmitted via transmitted frequency from one cell phone to another. This special signal will be labeled by block 404 that this is a special signal that has a secondary transmission from one cell phone to another cell phone. As the transmitter 405 will be transmitting the signal in special frequency selected for this service, it will not disturb a signal going on other frequencies. This signal will be marked as a second signal. Analyzer 406 will determine if the signal was issued directly or if it is the secondary signal that is transferred from one cell device to another cell device.

Analyzer 406 will transmit the secondary signal to block 407 to be descent to the next user. Block 407 will transmit a signal to the next cell user as a regular audio signal. The analyzer will understand this particular signal and descent to a particular user. The signal can be decoded with a special code that corresponds to a code of a particular cell phone user. If the signal has a special code which is descent to a particular user, a signal will not be transmitted to other cars, or other cell user. If the code of the signal does not correspond to the code of this particular cell phone, then the signal will get transmitted further to the next available user and so on.

Figure 5:
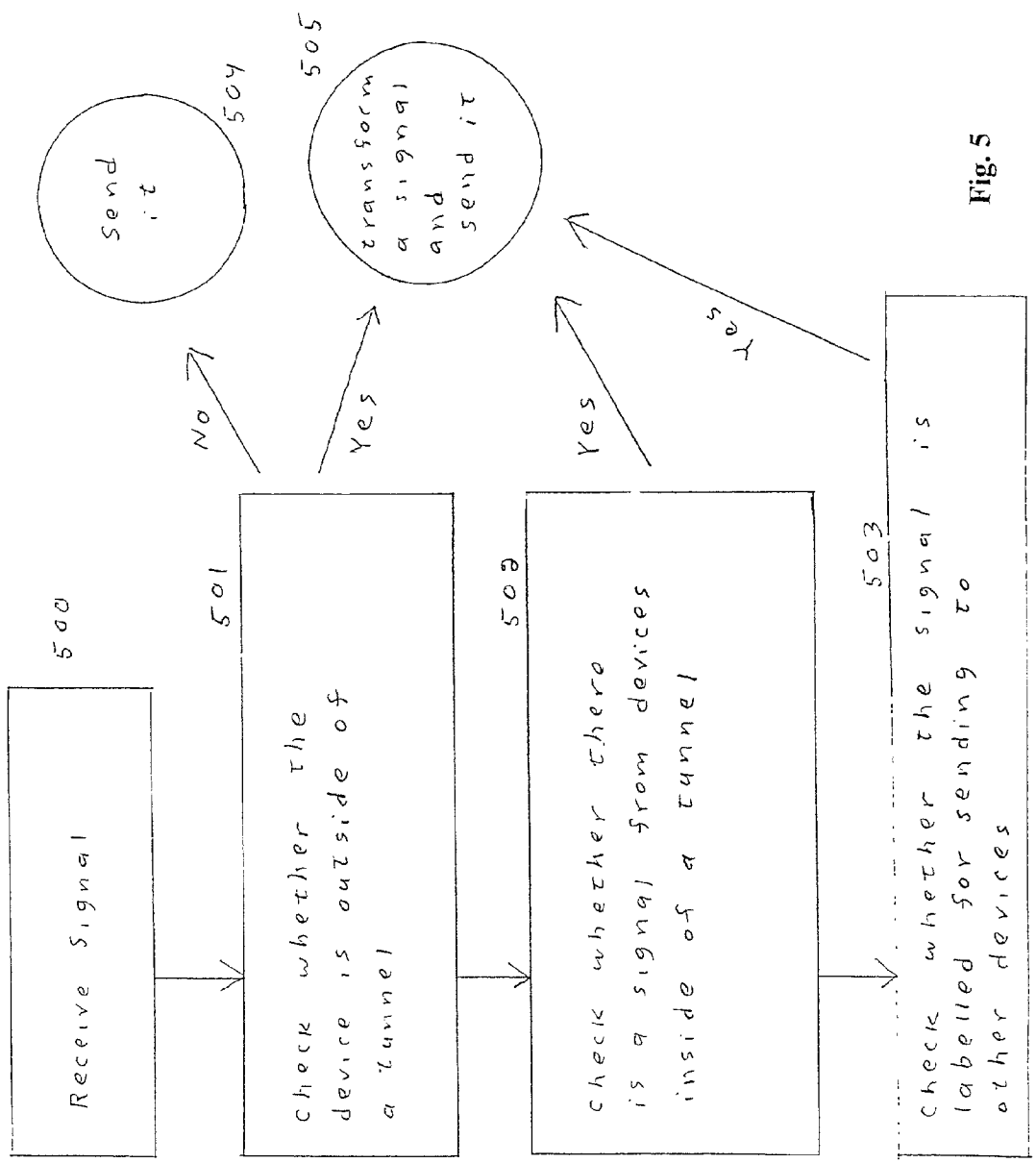
FIG. 5 illustrates how a signal can be transmitted into a tunnel.

FIG. 5 is a block diagram showing how the signal gets transmitted inside the tunnel. Device receives the signal 500. 501 checks whether the signal was received outside the tunnel or inside. If the signal was received outside the tunnel, the analyzer will check if it needs to transmit the signal inside the tunnel and how far from the tunnel it is located. The analyzer checks to see if it receives any signal from the cars inside the tunnel. Cars inside the runnel will send weak signals outside the tunnel indicating that they need information or that they are trying to transmit. The cars outside the tunnel will receive the signal from the cars inside the tunnel indicating that there is a request for the transmission from the cars inside the tunnel. Block 502 checks whether there is a signal that has been received from inside the tunnel. The analyzer inside the transeiver checks if the signal received has a special label identifying the secondary transmission. Also, it checks if the signal is marked for the user that is subscribing to that particular service. Also it checks whether the signal is marked as the emergency signal.

After this is determined, block 505 transmits the signal in a determined frequency, and the signal is marked as the secondary signal. Block 504 determines whether the signal transmitted inside the tunnel will be transmitted to the car next to it unconditionally. If the analyzer determines that the signal is labeled with the special code that is descent to a particular car, it will not be transmitted any further. It also will enable a determination of how many cars are currently inside the tunnel. This special signal will be sent from the satellite to a car outside the tunnel and transmitted to each of the cars inside the tunnel. The special signal marked with the special code will be used to compute the distance between the cars and it will count how many cars are in the tunnel. The satellite will receive the signal back which will help to determine to assess the number of cars in the tunnel.

Figure 6:
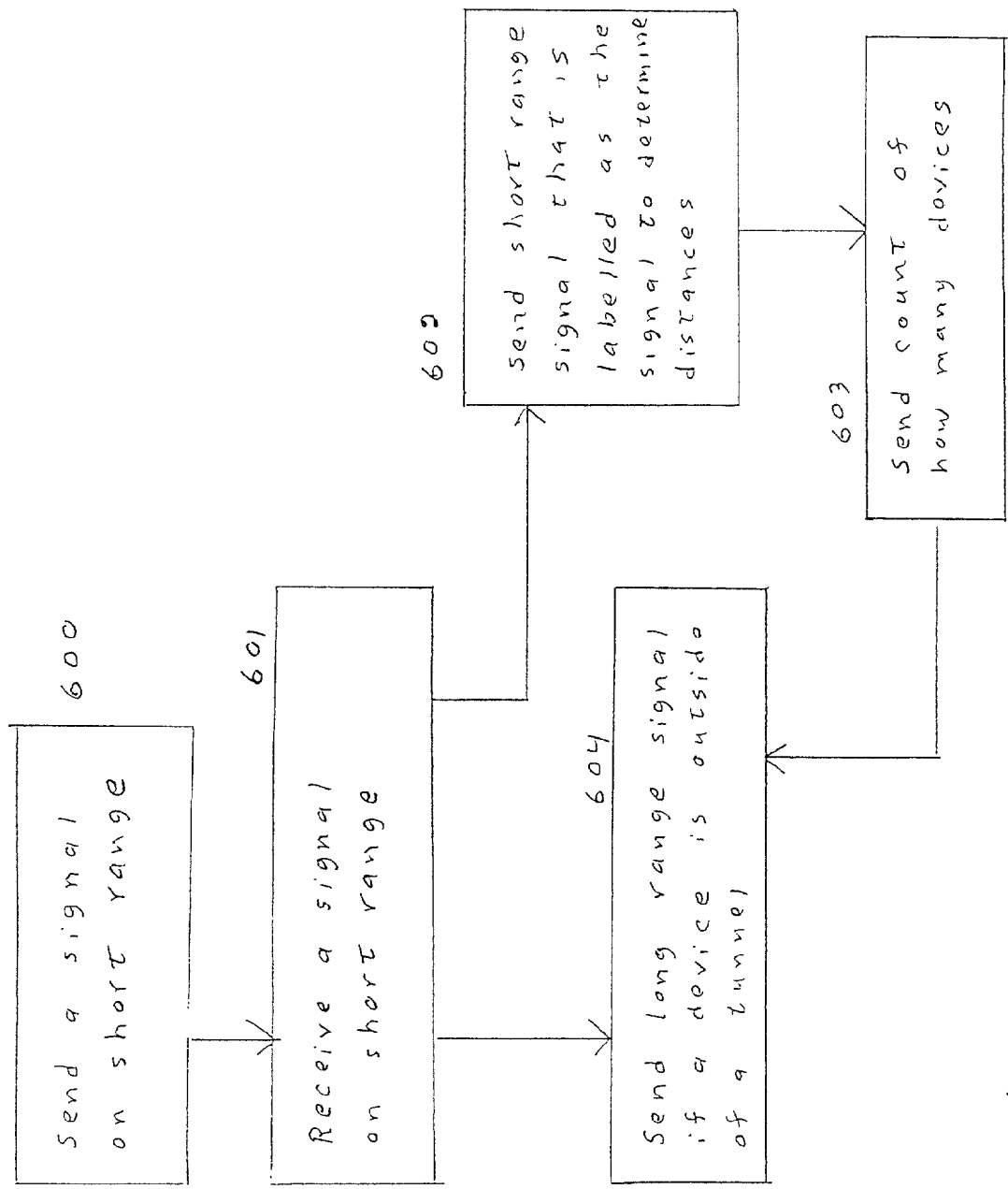
FIG. 6 is a flow chart outlining a preferred method for carrying out this invention.

FIG. 6 is a flow chart showing a procedure to determine traffic jams and the density of the population during gatherings in certain areas. Block 600 sends the short range signal, which is received by another device 601. If this device is outside the tunnel, it will send a long range signal to a satellite that will determine its location. If this device was inside the tunnel, the block 602 will send the short distance signal labeled as the signal to determine the distance between the next user with cell phone or car with electronic transceiver. This signal has the special purpose to determine the distance between the cars in the tunnel and this is how the signal is labeled. Block 603 counts how many cars received this signal. When the special signal gets transmitted from one car to another, distance and count is computed; and once it reaches the car outside the tunnel, the signal is redirected by this car to the satellite as the total information. A satellite computer can compute the number of cars in the tunnel. It is also possible to have special devices on the streets that will read the information from the electronic device inside the car and transmit this information to a satellite. This will allow computing the number of cars in certain locations. This also can be used for computing a density of people carrying or using cell phones.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of forming a virtual network, comprising:
   providing each of a plurality of mobile objects with a transceiver;
   transmitting a cellular/radio signals from a source;
   moving at least a first of the mobile objects into a defined location where the transceiver of the first mobile object does not receive the signal directly from the source;
   locating a second of the mobile objects in a position where the transceiver of the second mobile object receives the signal from the source;
   using the transceiver on the second mobile object to receive the signal from the source;
   the second mobile object checking whether the signal was received outside or inside said defined location, and determining whether the signal is marked for further transmission; and
   if the signal is marked for further transmission, then using the transceiver of the second mobile object to transmit the signal to the transceiver of the first mobile object.

2. A method according to claim 1, further comprising the step of providing each of the mobile objects with a sensor to determine when the transceivers of others of the mobile objects are not able to receive the cellular/radio signals directly from the source; and wherein when the sensor of one of the mobile objects determines that the transceiver of another of the mobile objects is not able to receive the signals directly from the source, the sensor of said one of the mobile objects activates the transceiver of said one of the mobile objects to transmit the signal to the transceiver of the other of the mobile object.

3. A method according to claim 1, wherein the mobile objects are cars or people.

4. A method according to claim 1, farther including the steps of verifying whether the signal is an emergency signal, and giving a preferred treatment for the emergency signal.

5. A method according to claim 4, wherein the step of giving a preferred treatment for the emergency signal includes the steps of assigning a most available frequency band for the emergency signal, and stopping transmitting other signal through this band.

6. A method according to claim 1, wherein the location where the transceiver on the first mobile object does not have access to the signal directly from the source is one or more of the following: in a tunnel, under a bridge, or in a subway.

7. A method according to claim 1, further comprising the step of determining whether the signal has reached the final user before sending the signal further.

8. A virtual network for transmitting cellular/radio signal, comprising:
   a plurality of transceivers;
   a plurality of mobile objects, each of the mobile objects having one of the transceivers;
   a source for transmitting cellular/radio signals;
   wherein a first of the mobile objects is in a defined location where the transceiver of the first mobile object does not have access to the signals directly from the source;
   wherein a second of the mobile objects is in a location where the transceiver of the second mobile object receives the signals from the source; and the second mobile object includes an analyzer for checking whether the signal was received outside or inside said defined location, and to determine whether the signal is marked for further transmission; and
   if the signal is marked for further transmission, then the transceiver of the second mobile object transmits the signals to the transceiver of the first mobile object.

9. A network according to claim 8, further comprising a plurality of sensors, and wherein each of the mobile objects is provided with one of the sensors to determine when the transceivers of others of the mobile objects are not able to receive the cellular/radio signals directly from the source; and wherein when the sensor of one of the mobile objects determines that the transceiver of another of the mobile objects is not able to receive the signals directly from the source, the sensor of said one of the mobile objects activates the transceiver of said one of the mobile objects to transmit the signal to the transceiver of the other of the mobile object.

10. A network according to claim 8, wherein the mobile objects are cars or people.

11. A network according to claim 8, wherein a chip can be embedded in EZ-pass for transmitting cellular signals between cars.

12. A network according to claim 8, wherein a chip can be added to cellular telephones to transmit signals between cellular telephones.

13. A network according to claim 8, wherein a local network of transmission devices is used to count the density of cars by determining distances between cars.

14. A virtual network for transmitting cellular/radio signal, comprising:
   a plurality of transceivers;
   a plurality of mobile objects, each of the mobile objects having one of the transceivers;
   a source for transmitting cellular/radio signals;

wherein a first of the mobile objects is in a defined location where the transceiver of the first mobile object does not have access to the signals directly from the source;

wherein a second of the mobile objects is in a location where the transceiver of the second mobile object receives the signals directly from the source; the second mobile object checks whether the signal was received outside or inside said defined location; and the transceiver of the second mobile object transmits the signal to the transceiver of the first mobile object; and wherein the transmission devices can be either chips in cellular telephones or in EZ passes.

15. A program storage device readable by machine, tangibly embodying a program of instructions executable by the machine to perform method steps for using a virtual network, wherein the virtual network comprises a plurality of transceivers; a plurality of mobile objects, each of the mobile objects having one of the transceivers; and a source for transmitting cellular/radio signals; wherein a first of the mobile objects is in a defined location where the transceiver of the first mobile object does not have access to the signals directly from the source; and wherein a second of the mobile objects is in a location where the transceiver of the second mobile object receives the signals from the source; said method steps comprising:

using the transceiver on the second mobile object to receive the signal directly from the source;

using the second mobile object for checking whether the signal was received outside or inside said defined location, and to determine whether the signal is marked for further transmission; and if the signal is marked for further transmission, then using the transceiver of the second mobile object to transmit the signal to the transceiver of the first mobile object.

16. A program storage device according to claim 15, wherein the network further comprises a plurality of sensors, and each of the mobile objects is provided with one of the sensors to determine when the transceivers of others of the mobile objects are not able to receive the cellular/radio signals directly from the source; and wherein when the sensor of one of the mobile objects determines that the transceiver of another of the mobile objects is not able to receive the signals directly from the source, the sensor of said one of the mobile objects activates the transceiver of said one of the mobile objects to transmit the signal to the transceiver of the other of the mobile object.

17. A program storage device according to claim 15, wherein the mobile objects are cars or people.

18. A program storage device according to claim 15, wherein the location where the transceiver on the first mobile object does not have access to the signal directly from the source is one or more of the following: in a tunnel, wider a bridge, or in a subway.

19. A method according to claim 1, for use with a multitude of automobiles in a first region and a multitude of people in a second region, and wherein said first of the mobile objects is one of said automobiles, and comprising the further steps of:

providing each of said multitude of automobiles with one of a first set of transceivers;

providing each of said people with one of a second set of transceivers;

each of a first group of said automobiles sending a first defined signal to the second mobile object;

the second mobile object using the received first defined signals to measure the distance said first defined signals traveled, and sending said measured distances to a satellite to determine the density of traffic in said first region;

using said measured distances to show on a computer screen traffic in said first region;

one of said first group of automobiles transmitting a second defined signal over a defined frequency bandwidth, and marking said second defined signal as an emergency signal;

blocking signals not marked as emergency signals, from being transmitted over said defined frequency bandwidth;

each of a first set of said multitude of automobiles receiving signals from others of said first set of said multitude of automobiles, and checking to determine if any of the received signals is marked as an emergency signal;

for each of a second group of said multitude of automobiles, i) providing the transceiver of the automobile with a given code, ii) the transducer of the automobile, upon receipt of any signal, using said given code to determine if the transducer is the intended final destination of said any signal, and iii) if the transducer is the determined final destination, the transducer not further transmitting said any signal.

the transceiver of each of a set of said multitude of people transmitting a third defined signal to the transceiver of a selected one of said multitude of people;

the transceiver of said selected one of the people using the received third signals to determine how many people are in said second region;

sending a fourth defined signal from a given satellite to the transmitter of a specified one of the automobiles;

said specified one of the automobiles transmitting the fourth defined signal to each of a second set of the multitude of automobiles; said fourth defined signal being marked with a defined code used to compute the distance between automobiles of said second set of automobiles, and used to count the number of automobiles in said second set; and the given satellite receiving the fourth defined signal to determine the number of automobiles in said second set.

20. A method according to claim 19, wherein:

each of the second set of automobiles is inside a tunnel;

the specified one of the automobiles is outside the tunnel;

the fourth defined signed is passed between the automobiles in the tunnel and to the specified one of the automobiles;

as the fourth defined signed is passed between the automobiles in the tunnel, said fourth defined signed counts the number of automobiles in the tunnel; and once said fourth defined signed reaches the specified one of the automobiles, said fourth defined signed is redirected by the specified one of the automobiles to said given satellite.

* * * * *